Patented Feb. 4, 1941

2,230,464

UNITED STATES PATENT OFFICE 2,230,464

CATALYTIC CRACKING AND CRACKING CATALYSTS

Robert F. Marschner, Chicago, Ill., assignor to Standard Oil Company, Chicago, Ill., a corporation of Indiana No Drawing. Application December 30, 1937, Serial No. 182,628

2 Claims. (Cl. 196—52)

This invention relates to the catalytic cracking of hydrocarbon materials and to cracking catalysts and methods of making them.

It is an object of my invention to provide improved methods of cracking petroleum fractions and other hydrocarbon materials, particularly to produce improved yields of high antiknock gasoline. Another object is to provide improved catalysts for such processes and a further object is to provide efficient and convenient processes for the manufacture of such catalysts. Still further and more detailed objects of my invention will become apparent as the description thereof proceeds.

Catalytic cracking processes are known which are superior in some respects to thermal cracking processes, particularly in that they produce greater yields of gasoline at a given temperature and moreover produce gasoline of higher antiknock rating than that produced by thermal cracking without catalysts. Furthermore, catalytic cracking can be carried out at about atmospheric pressure in relatively inexpensive apparatus while thermal cracking requires expensive apparatus, operating—as a rule—at high pressures.

I have discovered a new and superior catalyst for use in catalytic cracking. My new catalyst can be referred to as "boron silicate." However, it need not be the pure chemical compound of that name but can be any material of the general composition

$$aB_2O_3 \cdot bSiO_2 \text{ or } aB_2O_3 \cdot bSiO_2 \cdot cH_2O$$

The oxides of boron and silicon can be combined in any desired proportions to form solid solutions or loose chemical associations which are not bound by the rigid laws of stoichiometry. However, it is important that the $B_2O_3$ and $SiO_2$ be intimately associated with each other and not merely mechanically admixed. I therefore refer to my compositions as comprising boron and silicon oxides in intimate molecular association.

In the general formula $aB_2O_3 \cdot bSiO_2$, $a$ is suitably less than $b$ and can be from about 0.1% to about 50% of $a+b$. In other words, the composition can contain from 0.1 to 50 mol percent $B_2O_3$. In addition water can be present as indicated by the formula $aB_2O_3 \cdot bSiO_2 \cdot cH_2O$ and $c$ can range from zero to numbers of the same general order of magnitude as $a+b$. Minor proportions of other substances, notably metallic oxides, can be present but I prefer that my catalyst be substantially free from other substances, which in general have deleterious effects on catalytic activity. However, catalyst supports can, of course, be used as will hereinafter appear.

While $a$ can range from about 0.1% to about 50% of $a+b$, it is preferable that it range from about 0.5% to about 10%, or in other words that there be from about 0.5 to about 10 mol percent of boron oxide in my "boron silicate."

These catalysts can be prepared in various ways but I find it highly desirable to prepare them by making a silica gel, washing it free from contamination, suspending it in a hot solution of boric acid, and then drying the resulting boron silicate product. By this procedure at least 5 mol percent of $B_2O_3$ can be adsorbed on and combined with the $SiO_2$.

Such catalysts can be used by placing them in a suitable catalyst chamber and then passing hot hydrocarbon vapors through the chamber. The most desirable charging stocks are petroleum fractions such as heavy naphthas (which can be "reformed" to improve their knock rating), kerosene and gas oil or any other charging stock boiling predominantly within the range which includes the boiling ranges of heavy naphtha and gas oil, in other words from about 200° F. to about 750° F. It is preferable that these charging stocks be virgin or substantially virgin in nature since cracked stocks tend to form carbon and this carbon masks the catalyst and makes frequent regeneration imperative.

The conditions prevailing in the cracking chamber can suitably include temperatures from about 700° F. to about 1150° F. but preferably from about 900° F. to about 1100° F. The pressure can most conveniently be approximately atmospheric. Pressures of from about one-half atmosphere to about five atmospheres are preferred. Contact times from about one second to about one minute can be used but contact times of from about two seconds to about twenty-five seconds are particularly suitable. The optimum contact time is a function of the other conditions, particularly the temperature, as well as the nature of the stock to be cracked, and can readily be determined by experiment.

As an example of the method of preparing a catalyst in accordance with my invention as well as the use of it in a cracking process the following experiment will be described. The silica present in 640 cc. of 34° Baumé water glass, diluted with 500 cc. of distilled water, was precipitated with 100 cc. of concentrated hydrochloric acid. The gel was filtered and washed thoroughly with distilled water. One-quarter of the wet gel was then digested for two hours on a steam bath with a solution of 44 gms. of boric acid in 500 cc. of distilled water. Excess boric acid was then removed by repeated washing with distilled water, and the residue was dried at room temperature, yielding a product containing a little less than five mol percent $B_2O_3$ on a dry basis. This catalyst may be considered to be boron silicate supported on hydrated silica.

This catalyst should be heated to approximately the temperature at which it is to be used before incorporating it in the catalyst chamber since otherwise it tends to shrink in volume when subjected to reaction conditions.

The catalyst prepared as above described was used in cracking a virgin Mid-Continent 35° A. P. I. gravity gas oil at atmospheric pressure and a mean catalyst temperature of about 1010° F. At a space velocity of one volume of liquid feed per volume of catalyst zone per hour (equivalent to a contact time of about 4.4 seconds), this cracking reaction yielded 13% gas, 33% gasoline and 22% kerosene based on the amount of gas oil charged. Cracking this same stock without catalyst, at a mean temperature of 1035° F. and under other conditions similar to those prevailing in the catalytic cracking experiment the gasoline yield was only 17% based on charge. Moreover, the catalytically cracked gasoline had a much better knock rating than the thermally cracked gasoline. The blending value octane number (C. F. R. "Motor" method) of the catalytically cracked gasoline was 75 as compared with 69 for the thermally cracked gasoline.

By manufacturing "boron silicate" by the use of boric acid no impurities are introduced and in this respect my catalyst has a pronounced advantage over aluminum silicate prepared from an aluminum salt and silica gel. In the latter case some residual radical, such as $SO_4$, is left in the molecule. It is thus highly desirable to use boric acid in making my "boron silicate" catalyst but it is to be understood that other sources of borate ions can be substituted, for instance a solution of sodium tetraborate (borax) can be substituted for the boric acid in the manufacture of my catalyst.

While my boron silicate catalyst can be used as such and was so used in the experiment above outlined, it can be used to advantage deposited on a catalyst support. This is particularly true since my catalyst has a rather fragile structure and is therefore difficult to handle.

Inert supports can be used but I prefer to use a support which has some catalytic activity and various clays are therefore suitable. Kieselguhr, diatomaceous earth, Attapulgus clay, etc., can be used. It is desirable, however, to use an inexpensive material such as spent clay from operations such as the treating, sweetening and decolorization of mineral oils. Acid treated clays or acid treated earths can also be used.

Such a supported boron silicate catalyst can be made as follows:

A thoroughly agitated suspension of a finely-divided clay, such as "Attapulgus fines" in hot water, is treated first with a solution of sodium silicate, then with a solution of an acid such as hydrochloric. The acid may be added before the sodium silicate, but must be more than sufficient to neutralize the solution. The total amount of silica gel produced should not exceed 10% by weight of the clay present. The suspension is then washed free of sodium chloride. To the washed suspension of clay-supported silica gel is now added a solution of boric acid, the mixture is warmed for an hour or more, again washed thoroughly, and filtered. The resulting cake is molded as desired, dried, and employed as a cracking catalyst. It will be observed that the highly-catalytic material (boron silicate) is supported upon clay which is itself active.

My catalysts, either supported or unsupported, can be regenerated, after they become relatively inactive, by controlled blowing with oxygen-containing gases to remove the carbon deposited on the catalyst. For example, a mixture of air and flue gas can be used at a temperature of about 1000° F. The revivification operation can be accomplished without impairment of the activity of the catalyst by temperature regulation which can be accomplished by control of the rate of passage of revivification gas, control of its dilution, etc. Steam can be used in the revivification operation and it may also be desirable to introduce from about 1% to about 5% of steam with the stock charged to the cracking process.

"Promoters" can be used with my catalyst, particularly homogeneous (vapor phase) "promoters" such as hydrogen bromide, alkyl bromides, iodine, alkyl iodides, ethylene oxide, etc. Thus, for instance, a run was made using the catalyst above described together with 1% of n-butyl bromide added with the charge. At atmospheric pressure, a temperature of 925° F. and a space velocity of one volume of feed (measured as liquid) per volume of catalyst chamber per hour, 20.2% of the gas oil charged was converted into gasoline on a once-through basis. The gasoline had a blending value octane number of 79.5. Another run made on the same stock, with the same catalyst, and under the same conditions except that no "promoter" was used gave a gasoline yield of only 9.7% and a blending value octane number of only 75.

While I prefer to prepare my "boron silicate" catalyst by the use of boric acid and silica gel as above described it will be apparent that "boron silicate" can be prepared in other ways. For instance, it can be made by reacting halides of boron and silica with steam or water. Boron trifluoride and silicon tetrachloride are suitable but boron trichloride, and silicon oxychloride or silicon tetrafluoride can be used. The halide vapors can be generated separately and mixed in correct proportions and then precipitated with steam. They can, on the other hand, be conducted separately to the catalyst bed and adsorbed thereon. Steam can then be introduced to hydrolyze these halides. Water required for hydrolysis can be applied to the catalyst bed before applying the halide vapors. This method of preparing my boron silicate catalyst has the advantage that the catalyst bed can be regenerated by depositing a fresh surface of boron silicate thereon.

I claim:

1. The method of preparing a catalyst for cracking heavy hydrocarbon oils to gasoline in the vapor phase comprising suspending wet hydrated silica gel in an aqueous solution containing a boron compound, digesting said solution of boron compound and the suspension of silica gel, combining the said boron compound with the silica gel to form boron silicate adsorbed on the hydrated silica gel, removing the uncombined boron compound and drying the residue to produce a catalyst consisting essentially of boron silicate adsorbed on hydrated silica.

2. The method of cracking heavy hydrocarbon oil to gasoline comprising contacting the vapor of said oil at elevated cracking temperatures with a catalyst consisting essentially of boron silicate supported on hydrated silica, said catalyst having been prepared by precipitating silica gel, digesting the wet gel with a solution of a boron compound, adsorbing boron oxide on said hydrated gel, removing the unadsorbed boron compound, and drying the residue to produce a product containing 0.5% to about 10% boron oxide in molecular association with silicon oxide.

ROBERT F. MARSCHNER.